UNITED STATES PATENT OFFICE.

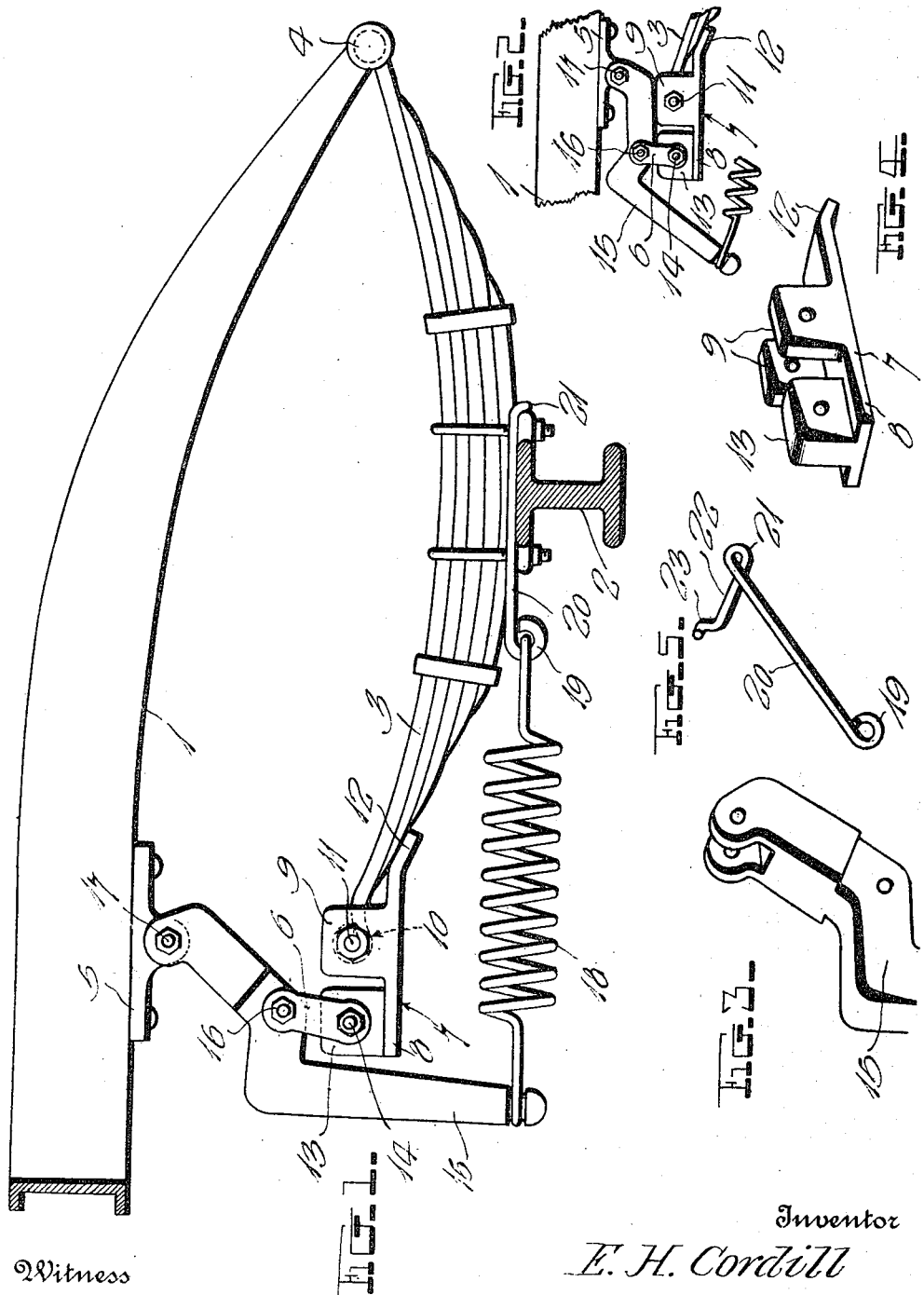

EMERY H. CORDILL, OF IANTHA, MISSOURI.

SHOCK-ABSORBER.

1,297,799.  Specification of Letters Patent.  Patented Mar. 18, 1919.

Application filed November 1, 1918. Serial No. 260,686.

*To all whom it may concern:*

Be it known that I, EMERY H. CORDILL, a citizen of the United States, residing at Iantha, in the county of Barton and State of Missouri, have invented certain new and useful Improvements in Shock-Absorbers; and I do declare the following to be a full, clear, and exact description of the invention, such as will enable others skilled in the art to which it appertains to make and use the same.

My invention has for its principal object to provide a simply constructed and inexpensive, yet highly efficient and durable shock absorber which may be quickly and easily applied to automobiles and other vehicles without necessitating any alterations therein, the construction being such as to allow the usual spring shackles to be employed as a part of the shock absorber.

In carrying out the above end, an extension is provided for one end of the usual semi-elliptical spring, the shackle links project upwardly from this extension, a bell crank lever is fulcrumed to said links, one end of said lever is pivoted to the chassis frame, and a coil spring is connected to the other end of said lever to yieldably control its movement; and a further object of the invention is to so construct the several parts as to allow the upper end of the lever to strike the extension of the spring in such a manner as to limit the movement of said lever under severe strain, thus preventing any possibility of injuring the coil spring.

A still further object is to provide a simply, and easily attached, yet effective anchor for the coil spring above mentioned.

With the foregoing objects in view the invention resides in the novel features of construction and unique arrangements of parts, hereinafter fully described and claimed, and illustrated in the accompanying drawing.

Figure 1 is a side elevation of the invention applied, showing the normal relation of parts.

Fig. 2 is a detail side elevation on a reduced scale showing the relation of parts when placed under an unusual strain.

Fig. 3 is a perspective view of the upper end of the bell crank lever.

Fig. 4 is a perspective of the extension of the vehicle spring.

Fig. 5 is a view in perspective of the anchor for the shock absorbing spring.

In the drawings above briefly described the numeral 1 designates a portion of an automobile chassis frame, 2 has reference to one of the axles, and 3 indicates a semi-elliptic leaf spring. One end of the spring 3 is pivoted at 4 to the frame 1, and in the ordinary automobile, the other end of the spring is connected to a bracket 5 on the frame, by shackle links 6. Due to the nature of the present invention however, these links are removed and applied for a different purpose.

A rigid extension 7 is provided for the end of the spring 3 with which the links 6 are usually connected, and although said extension could be constructed in a number of ways, I have shown only one form for illustrative purposes, such form consisting of a base plate 8 having a pair of up-standing cheeks 9 which receive therebetween the usual eye 10 on the end of the spring, the bolt 11 which was formerly used for connecting the links 6 to said spring, being now passed through the eye and cheeks to fasten the extension 7 to the spring. The inner end of the base plate 8 extends beyond the cheeks 9 and is suitably shaped to form a shoe 12 underlying the spring 3 to prevent the outer end of said plate from tilting downwardly. The last named end of plate 8 is provided with an upstanding lug 13 to which the lower ends of the links are pivoted by a bolt or the like 14.

A bell crank lever 15 is received between the upper ends of the links 6 and is pivoted thereto by a bolt or other suitable means 16, the upper arm of said lever being inclined upwardly from the fulcrum and pivoted at 17 to the bracket 5. The lower end of the lever 15 is suitably connected to one end of a coil spring 18 located beneath the extension 7 and the adjacent end of spring 3. The spring 18 is connected to an eye 19 on a rod 20, said rod passing over the axle 2 at one side of the spring 3, curving downwardly at 21 in front of said axle, then extending laterally at 22 beneath the spring, and finally turning upwardly at 23. The longitudinal portion of the rod 20 and its upwardly bent end 23 serve to prevent lateral shifting, while the downward turn 21 and the lateral extension 22 prevent rearward shifting of the rod. An effective anchor for the spring 18 is thus formed and it will be obvious that such anchor may be constructed easily and inexpensively.

To install the device, it is simply necessary to remove the shackle links 6, secure the extension 7 in place by one of the bolts previously used on said links, to connect the links to the lug 13 probably by the other bolt, to connect the links with the lever 15, pivot said lever to the bracket 5, and engage the anchor rod 20 with the spring and axle as shown. Under slight strain, the lever 15 rocks upon its fulcrum and the spring 18 yields to absorb the shocks, the relatively stiff leaves of the spring 3 then coming into play very little if at all. Under severe shocks, the lever 15 swings until its normally inclined upper end moves downwardly onto the checks 9 as shown in Fig. 2. The movement of the lever is thus limited so that breakage of the spring 18 is prevented and the spring 3 then comes into play in the same manner as if the shock absorber were not employed.

From the foregoing taken in connection with the accompanying drawing, it will be obvious that although my invention is of comparatively simple and inexpensive nature, it will be highly efficient and in every way desirable. Since probably the best results are obtained from the details shown and described, they may well be followed, but within the scope of the invention as claimed, considerable latitude is allowed for making such minor changes as occasion may dictate.

I claim:

1. In combination with a vehicle frame and one end of a leaf spring below the same, a longitudinal extension on said end of the spring, a link pivoted to and rising from the outer end of said extension, a bell crank lever fulcrumed to the upper end of said link and having one end pivoted to said frame, and spring means connected to the other end of said lever for yieldably controlling its movement.

2. In combination with a vehicle frame and one end of a leaf spring below the same, a longitudinal extension for said spring having a pair of vertical cheeks receiving said spring end therebetween, a bolt passing through said cheeks and through said spring end, the inner end of said extension having a shoe underlying the spring to prevent downward tilting of the outer end of said extension, a link pivoted to and rising from the outer end of said extension, a bell crank lever fulcrumed to the upper end of said link and having one end pivoted to said frame, and spring means connected to the other end of said lever for yieldably controlling its movement.

3. A structure as specified in claim 1, the upper end of said lever normally inclining upwardly from said extension and being movable downwardly onto the latter under severe strain, whereby to limit the swinging of the lever and prevent injury of said spring means.

4. The combination with a vehicle frame, an axle, a vehicle spring secured to said axle, and shock absorbing means associated operatively with said spring and frame and including a coiled spring; of a rod to which said coiled spring is anchored, said rod extending over the axle at one side of the vehicle spring, curving downwardly at one side of said axle, then extending laterally beneath the vehicle spring, and finally turning upwardly at the side of said vehicle spring remote from the body portion of the rod.

In testimony whereof I have hereunto set my hand.

EMERY H. CORDILL.

Witnesses:
W. E. SLUDEN,
E. L. MOORE.